United States Patent

Masaki et al.

[11] Patent Number: 5,894,875
[45] Date of Patent: Apr. 20, 1999

[54] PNEUMATIC RADIAL TIRE WITH FLAT 1×6 STEEL BELT CORD

[75] Inventors: Takeo Masaki; Eiji Igarashi; Yoshiki Kanehira; Tosio Kawai; Ryuzou Komatsu, all of Hiratsuka, Japan

[73] Assignee: The Yokohama Rubber Co., Ltd., Tokyo, Japan

[21] Appl. No.: 08/716,357

[22] PCT Filed: Jan. 23, 1996

[86] PCT No.: PCT/JP96/00118

§ 371 Date: Mar. 13, 1997

§ 102(e) Date: Mar. 13, 1997

[87] PCT Pub. No.: WO96/22892

PCT Pub. Date: Jan. 8, 1996

[30] Foreign Application Priority Data

Jan. 24, 1995 [JP] Japan ................... 7-008842
Dec. 20, 1995 [JP] Japan ................... 7-332257

[51] Int. Cl.$^6$ .............. B60C 9/18; B60C 9/20; B60C 9/22
[52] U.S. Cl. .............. 152/527; 57/200; 57/902; 152/451; 152/531
[58] Field of Search .............. 152/527, 451, 152/531; 57/902, 200

[56] References Cited

U.S. PATENT DOCUMENTS 4,938,015  7/1990  Kinoshita .

FOREIGN PATENT DOCUMENTS

| 0 363 893 | 4/1990 | European Pat. Off. . |
|---|---|---|
| 62-105805 U | 7/1987 | Japan . |
| 63-270886 | 11/1988 | Japan . |
| 1-26882 B2 | 5/1989 | Japan . |
| 3-96402 | 4/1991 | Japan . |
| 4-3474 | 1/1992 | Japan . |
| 4-77 | 1/1992 | Japan . |

OTHER PUBLICATIONS

Database WPI, Section Ch, Week 9414, Derwent Publications Ltd., London, GB; Class A95, AN 94–115661, XP002060666 & JP 06 065 877 (Kanai H), Mar. 8, 1994, Abstract.
Form PCT/ISA/210 for PCT/JP96/00118.

*Primary Examiner*—Adrienne Johnstone
*Attorney, Agent, or Firm*—Finnegan, Henderson, Farabow, Garrett & Dunner, L.L.P.

[57] ABSTRACT

A pneumatic radial tire includes a belt layer, comprised of steel cords having a lateral flat cross-section, arranged around an outer periphery of a tread portion of a carcass layer so that the diameter direction of the steel cords is made to follow the planar direction of the belt layer, the steel cord is made a flat 1×6 twist structure comprised of filaments of a filament diameter d of 0.20 to 0.40 mm, the long diameter $D_L$ and twist pitch P of the steel cord taken out from the tire are made with respect to the filament diameter d as follows:

$3.67\ d-0.04 \leq D_L \leq 3.67\ d+0.16$ $30d \leq P \leq 45d$ and the elongation of the steel cord caused when increasing a load from 0.25 kg to 5.0 kg is made 0.25% or less.

12 Claims, 3 Drawing Sheets

PNEUMATIC RADIAL TIRE WITH FLAT 1×6 STEEL BELT CORD

TECHNICAL FIELD

The present invention relates to a pneumatic radial tire using steel cords in a belt layer thereof, more specifically it relates to a pneumatic radial tire suitable for use in a light truck (LT) or a recreational vehicle (RV).

BACKGROUND ART

In the past, for the belt material of a pneumatic radial tire for a light truck (LT) or a recreational vehicle (RV), steel cords having twisted structures of 2+7, 2+6, 3+6, etc. were widely used. These twisted steel cords, however, are high in cost since two twisting processes are necessary for the twisting and are low in corrosion resistance since there is insufficient penetration of rubber into the steel cord, and therefore, there was the problem of the tire having a lower durability.

To eliminate this defect of the steel cords requiring two twisting processes, a flattened (or ellipse or oval) open structure of a 1×4 or 1×5 twist structure has been developed. However, as a result of studies by the present inventors, it has been found that a flattened open 1×4 or 1×5 twist structure is insufficient in strength as the belt material of a pneumatic radial tire for a light truck or a recreational vehicle. Therefore, consideration has been given to making it a 1×6 twist structure or a larger 1×7 twist structure. However, the inventors found that there was the defect that the cord shape became unstable in the case of a 1×7 structure.

However, even when adopting a flattened open 1×6 twist structure, it was necessary to make the flatness ratio (short diameter $D_S$/Long diameter $D_L$) smaller in order to ensure that the rubber fully penetrated into the steel cord. Therefore, the long diameter $D_L$ becomes inevitably larger. As a result, when arranging the cord so that its long diameter direction was along the planar direction of the belt layer, when the count of the steel cord is made equivalent to the count of the belt layer used in the past, the interval between cords becomes smaller, and therefore, the problem occurs that the durability of the belt edges falls.

Further, in the case of a 1×6 twist structure, there is the problem that the twist structure becomes unstable compared with the 1×4 or 1×5 twist structure and tends to cause defects in the twisting.

DISCLOSURE OF INVENTION

Accordingly, the object of the present invention is to provide a pneumatic radial tire which, when adopting a cost effective 1×6 twist structure for the steel cord of the belt layer, is capable of minimizing the long diameter of the cord to such an extent that the rubber can stably penetrate into the cord, whereby the twist structure is stabilized, and the steering stability and durability of the belt edge portion are improved.

In accordance with the present invention, there is provided a pneumatic radial tire comprising a belt layer, comprised of steel cords having a lateral flat cross-section, arranged around an outer periphery of a tread portion of the carcass layer so that the diameter direction of the steel cords is made to follow the planar direction of the belt layer, wherein the steel cord is made of a flat 1×6 twist structure comprised of filaments having a diameter d of 0.20 to 0.40 mm, the long diameter $D_L$ and twist pitch P of the steel cord when taken out from the tire are, with respect to the filament diameter d, as follows:

$3.67\ d-0.04 \leq D_L \leq 3.67\ d+0.16$; and $30d \leq P \leq 45d$, and the elongation of the steel cords caused when increasing a load from 0.25 kg to 5.0 kg is 0.25% or less.

BRIEF DESCRIPTION OF THE DRAWINGS

The present invention will now be explained in further detail with reference to the drawings, wherein.

FIG. IA and FIG. IB are each a lateral cross-section view of a steel cord used in a belt layer of a pneumatic radial tire of the present invention.

BEST MODE FOR CARRYING OUT THE INVENTION

According to the present invention, as previously mentioned, when the steel cord comprising the belt layer is made of a cost-effective 1×6 twist structure, and the cord long diameter $D_L$ and the twist pitch P are in the ranges specified above by the above formulas, the twist structure can be stabilized, while good penetration of the rubber into the cord is maintained and further since the cord long diameter is minimized, the necessary cord intervals can be maintained even with the same cord count as in a conventional belt layer. As a result, it is possible to reduce durability problems due to belt edge separation. Further, since the elongation of the steel cord in the low load region is small, it is possible to also improve the tire's steering stability.

In the present invention, more preferably, the flatness ratio $(D_S/D_L)$ of the steel cord, expressed by the ratio of its short diameter $D_S$ to its long diameter $D_L$, in the above twist structure is in the range of from 0.55 to 0.80 and more preferably is from 0.58 to 0.75. By using such a flatness ratio, the above action and effect can be improved.

The expression "flattened open" used herein means the lateral cross-section of the steel cord is flattened and the filaments comprising the steel cord do not contact each other, and therefore, form a clearance at least at one location.

Figure 2:
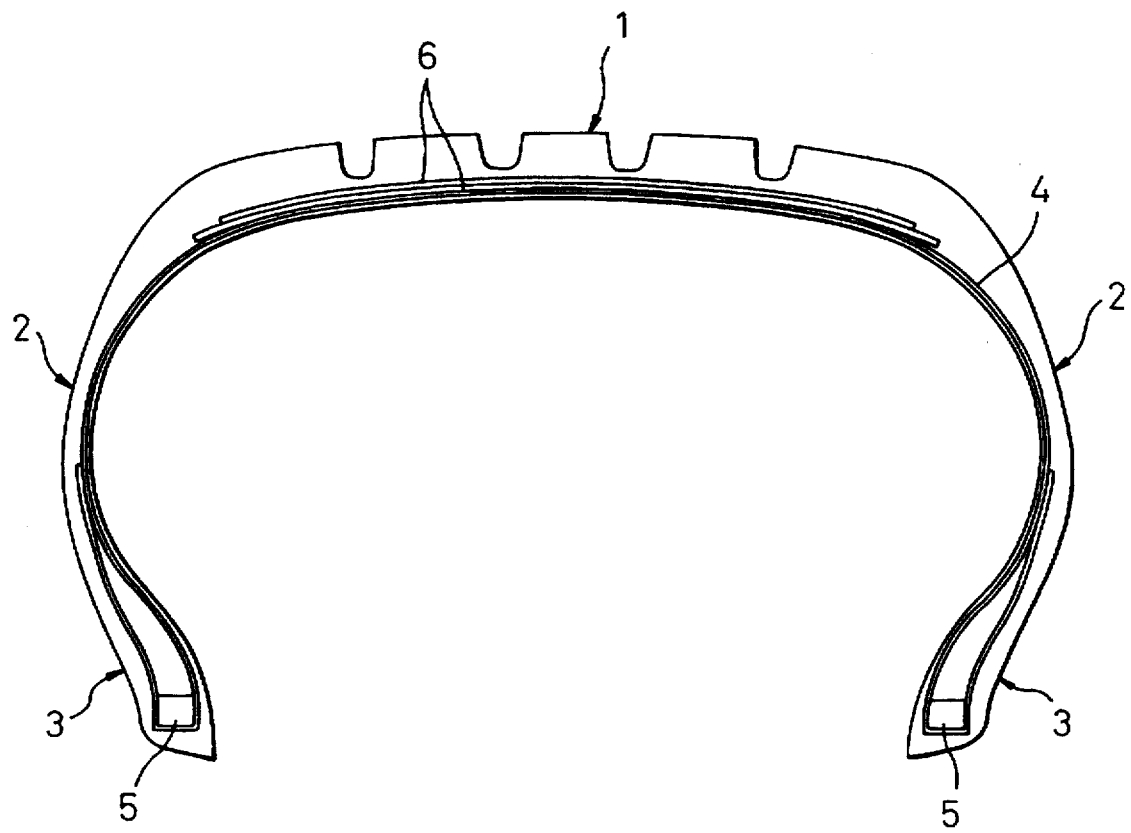
FIG. 2 is a cross-sectional view taken along the meridian of an example of a pneumatic radial tire according to the present invention.

FIG. 2 is a cross sectional view taken along the meridian of a pneumatic radial tire according to the first embodiment of the present invention.

In FIG. 2, 1 is a tread portion, 2 a side portion, 3 a bead portion, and 4 a carcass portion. The carcass portion 4 is reinforced by fiber cords arranged approximately 90° with respect to the tire circumferential direction. The carcass layer extends from the tread portion 1 to the left and right side portions 2, 2, and has its two ends folded back from the inside to the outside of the tire around the left and right bead cores 5, 5. The fiber cords forming the carcass layer 4 include, for example, an organic fiber cord such as a polyester fiber cord, a nylon fiber cord, an aromatic polyamide fiber cord, or a polyvinyl alcohol fiber cord.

On the outer circumference of the tread portion 1 of the carcass layer 4 are arranged two belt layers 6, 6 composed of the steel cord of the construction explained below, so as to extend over one circumference of the tire. This steel cord is arranged at an angle of 15° to 60°, preferably 15° to 30°, with respect to the tire circumferential direction, to give a relationship where the two belt layers 6, 6 cross each other.

Note that, in the illustrated example, there are two belt layers, but the number of the belt layers is not limited to two. It may be three or even four, based upon the required performance.

Figure 1A:
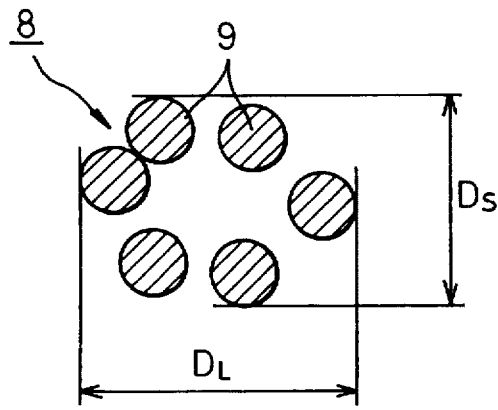
Figure 1B:
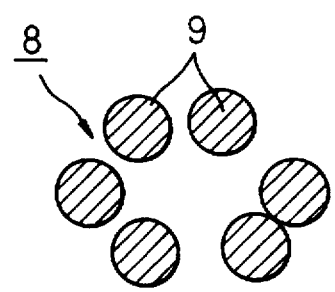

FIG. 1A and FIG. 1B are lateral cross-sectional views of the steel cord 8, cut at any location in the longitudinal direction. The steel cord has a 1×6 structure of six filaments 9 twisted into one in the S- or Z-direction and has a shape crushed into a flat lateral cross-section. Between the mutually adjoining filaments 9, 9 is formed at least one clearance where there is no contact (five locations in the figure). In this way, the rubber can penetrate more easily into the cord and the steel cord 8 becomes a so-called open structure.

Further, as is clear from a comparison of the two cross-sections of FIG. 1A and FIG. 1B, the arrangement and mutual clearance of the filaments of the steel cord 8 are not the same at the two cross-sections. That is, the arrangement of the filaments 9 along the longitudinal direction of the steel cord 8 changes irregularly. Further, the individual filaments 9 are not straight, but have an irregular wave-form.

The steel cord used in the belt layer of the pneumatic radial tire of the present invention has the above flattened open 1×6 twist structure and has a filament diameter d of the filaments comprising the steel cord in the range of 0.20 to 0.40 mm. When the filament diameter d is made smaller than 0.20 mm, the cord strength becomes insufficient. Also, the smaller the filament diameter d, the higher the manufacturing cost. On the other hand, when the filament diameter d is larger than 0.40 mm, the resistance to flexing fatigue of the steel cord falls.

Further, in the present invention, the steel cord is made to have a ratio of the size of the long diameter $D_L$ to the filament diameter d of the filament in the state when the cord is out of the tire in the range of:

$3.67d-0.04 \leq D_L \leq 3.67d+0.16$

Figure 3:
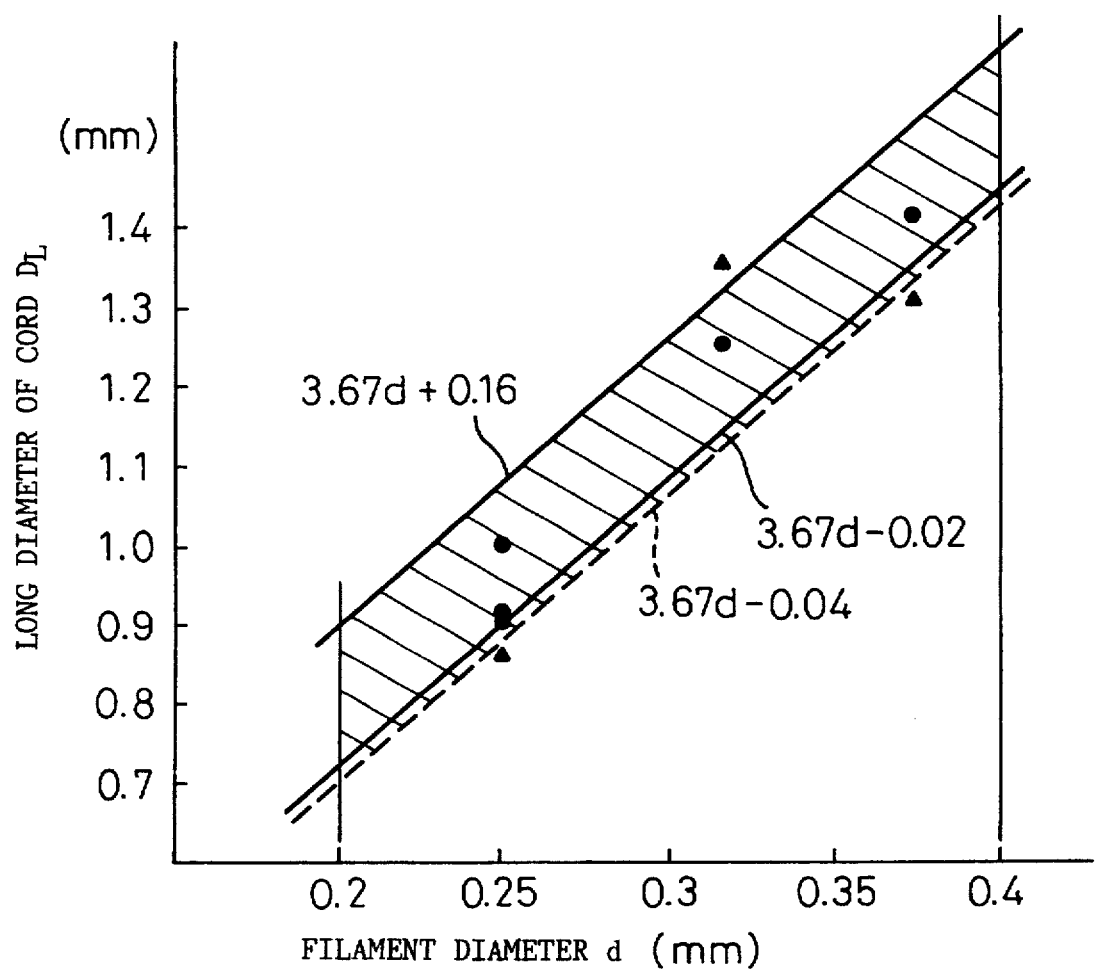
FIG. 3 is a graph illustrating the relationship between the long diameter $D_L$ and the filament diameter d of the cord.

That is, in the graph shown in FIG. 3, it is made to be in the region shown by the hatching. More preferably, it is made to be in the range of:

$3.67d-0.02 \leq D_L \leq 3.67d+0.16$

The term, "state when the cord is taken out of the tire" is used herein because the cord deforms due to forces received during various processes in the manufacture of a tire and the amount of deformation also changes depending upon the manufacturing conditions, tire size, and tire specifications. Accordingly, in order to ensure that the rubber can penetrate the cord, it is necessary to specify the cord diameter when it is out of the tire.

The cord diameter in the state when it is taken out from the tire can be specified as follows: That is, the cord taken out from the tire is embedded in plastic having the rubber attached thereto and cured, the cross-section is then polished and an optical micrometer (for example, the V-12 projector made by Nikon) capable of measuring down to 0.001 mm is used for measurement. The maximum diameter length of the cord is defined as $D_2$ and the minimum diameter length as $D_3$.

When the size of the long diameter $D_L$ is less than $(3.67d-0.04)$, it becomes difficult to achieve a penetration of the rubber into the steel cord of a sufficient amount of 80% or more. On the other hand, when the lower limit of the long diameter $D_L$ is made larger than $(3.67d-0.02)$, the rate of penetration of rubber can be 90% or more.

When the size of the long diameter $D_L$ is larger than $(3.67d+0.16)$, the long diameter becomes excessively large, and therefore, when using the same cord count as that which had been used for the belt layer of a conventional radial tire, the interval between cords becomes too narrow and the durability of the belt edge is decreased.

Further, the flatness ratio $(D_S/D_L)$ of the cord, expressed as the ratio of its short diameter $D_S$ to its long diameter $D_L$, should be in the range of from 0.55 to 0.80.

Further, the above-mentioned steel cord has a ratio of the twist pitch P to the filament diameter d in the state when it is taken out from the tire of $30\,d \leq P \leq 45d$ When the twist pitch P is larger than 45d, then one filament in the 1×6 structure will easily fall into the center of the cord and, as a result, a poor shape will be generated due to the poor twisting and the penetration of the rubber will decline. Further, when the twist pitch P is less than 30d, the rate of utilization of the strength of the filaments will be decreased, which would be disadvantageous economically.

In the present invention, the cord diameter of the steel cord is kept as small as possible, and therefore, the long diameter $D_L$ is kept small as well by using as the filament a high strength material having a carbon content of 0.82 to 0.92% and a tensile strength of 320 to 380 kgf/mm².

Further, the steel cord when it is taken out from the tire should have an elongation when increasing a load from 0.25 kg to 5.0 kg of 0.25% or less, more preferably 0.2% or less. If the cord has an elongation at a load of 5.0 kg of more than 0.25%, the initial elongation is large, so therefore the handling response is decreased and the steering stability is decreased.

The steel cord comprised of the above structure can be fabricated by processing six filaments to give them a wave-shape in advance, twisting these by an ordinary twisting machine, and then passing the result through a pinch roller to crush it flat.

Figure 4:
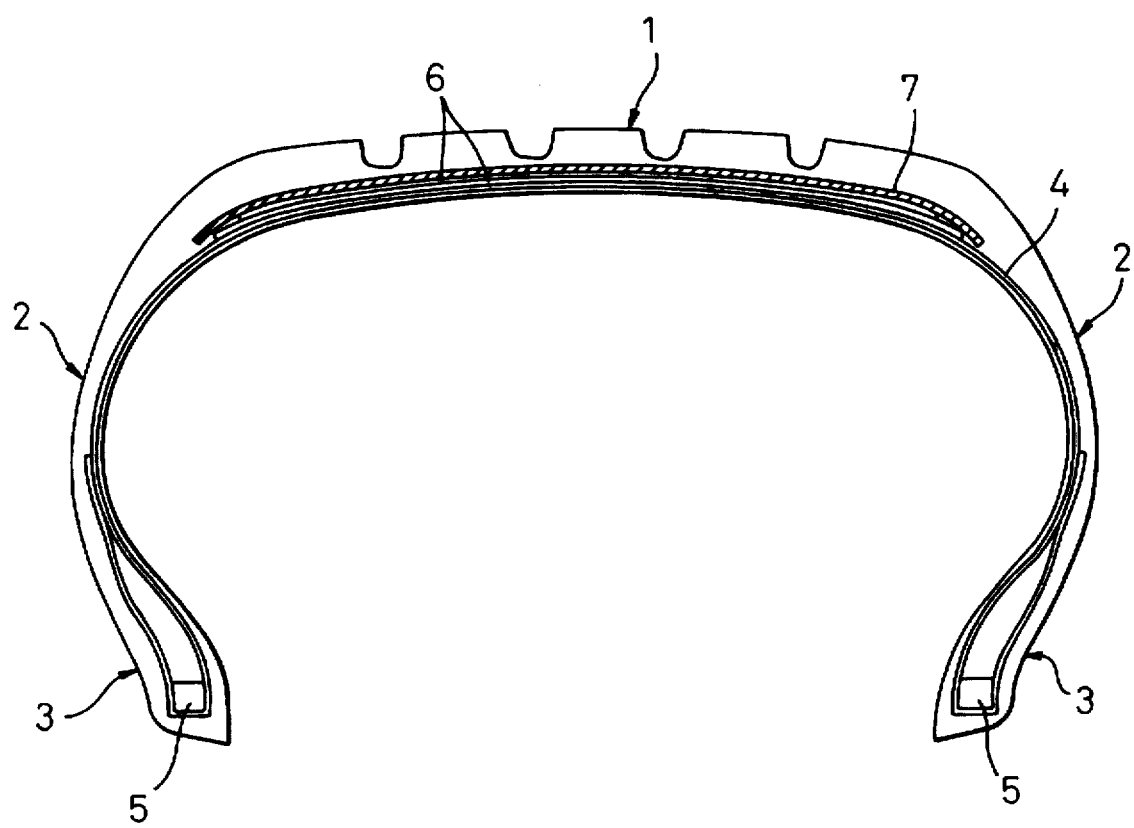
FIG. 4 is a cross-sectional view taken along the meridian of another example of a pneumatic radial tire according to the present invention.

Further, in the present invention, as shown in FIG. 4, it is possible to arrange at the outer circumference of the outermost belt layer 6 at least one cap ply 7 composed of an organic fiber cord with a cord angle with respect to the tire circumferential direction of about 0° so as to cover the entire width of the belt layer. By using this configuration, there is the effect that, under conditions of use or application at a relatively high air pressure such as used in a light truck tire, the elongation of the steel cord of the present invention at the time of a low load is small and also it is possible to effectively suppress the growth of the outer circumference of the tire due to high air pressure.

The organic fiber cord of the cap ply 7 is not particularly limited, but can be an organic fiber cord with a low elasticity such as a nylon fiber cord. Use of a cord having a larger elasticity, however, that is, an organic fiber cord with an elasticity of at least 800 kgf/mm² and further 800 kgf/mm² to 5000 kgf/mm² is preferred. Examples of an organic fiber cord with an elasticity of at least 800 kgf/mm² are a polyester fiber cord, aromatic polyamide fiber cord (aramid fiber cord such as para phenylene terephthalamide cord), rayon fiber cord, polybenzobisoxazole fiber cord (PBO), or polyethylene naphthalate fiber cord (PEN).

EXAMPLES

The present invention will now be explained in further detail in accordance with Examples, but the scope of the present invention is of course not limited to these Examples.

Examples 1 to 3 and Comparative Examples 1 to 5

Three types of steel filaments composed of filament diameters d of 0.25 mm, 0.32 mm, and 0.37 mm were used and, as shown in Table 1, the flatness ratio, cord long diameter $D_L$, twist pitch P, and elongation at a load of 0.25 to 5.0 kg were made different to fabricate eight types of flattened open 1×6 structure steel cords (Examples 1 to 3 and Comparative Examples 1 to 5). Further, the relationship between the filament diameter d and the cord long diameter $D_L$ of the eight types of steel cords was plotted in FIG. 3. In FIG. 3, the black circles show the case where the relationship between the filament diameter d and the cord long diameter $D_L$ is within the scope of the present invention, while the black triangles show the case where it is outside of the scope of the present invention.

These eight types of steel cords were observed as to the state of their twist, whereupon it was found that the cord of Comparative Example 3 had too large a twist pitch, and therefore, suffered from a poor twist state.

Seven types of steel cord, not including the cord of Comparative Example 3, were processed into belt layers of counts shown in Table 1 to fabricate seven types of pneumatic radial tires. These tires were measured with resepct to their steering stability, occurrence of cracks at belt edge portions after driving, and penetration of rubber inside the steel cord, whereupon the results shown in Table 1 were obtained.

From Table 1, it is clear that when the long diameter of the cord in Comparative Example I was too large and with the count indicated, edge separation (cracking) tended to easily occur. Conversely, it was found, in Comparative Example 2 and Comparative Example 5, when the long diameters of the cords were too small, rubber penetration was poor.

Note that the measured values are values obtained by the following methods:

(1) Steering Stability

The tire was mounted on an actual car and its superior/inferiority evaluated by an average value of feeling tests conducted by five test drivers.

(2) Presence of Cracks in Belt Edge Portion

A tire was disassembled after actual driving over 60,000 km and the presence of cracks in the belt edge portion was visually examined.

(3) Rubber Penetration

The steel cord was taken out of a new tire. Three filaments each of the cord were pulled apart and the degree of penetration of the rubber inside the cord was visually observed. This was shown by the ratio of the portion, where the rubber had penetrated completely among the filaments to the length observed.

TABLE 1

|  | EX. 1 | EX. 2 | EX. 3 | COMP EX. 1 | COMP EX. 2 | COMP EX. 3 | COMP EX. 4 | COMP EX. 5 |
| --- | --- | --- | --- | --- | --- | --- | --- | --- |
| Filament diameter d (mm) | 0.25 | 0.32 | 0.37 | 0.32 | 0.25 | 0.25 | 0.25 | 0.37 |
| Flatness ratio | 0.70 | 0.70 | 0.66 | 0.65 | 0.78 | 0.70 | 0.70 | 0.70 |
| Cord long diameter (mm) | 0.92 | 1.25 | 1.41 | 1.35 | 0.86 | 0.91 | 1.00 | 1.30 |
| Twist pitch (mm) | 10 | 12 | 16 | 12 | 10 | 12 | 10 | 16 |
| 0.25 to 5.0 load elongation (%) | 0.17 | 0.14 | 0.12 | 0.15 | 0.17 | 0.17 | 0.30 | 0.11 |
| Count (filaments/50 mm) | 35 | 30 | 25 | 30 | 35 | 35 | 35 | 25 |
| State of defects of twist | Good | Good | Good | Good | Good | Poor | Good | Good |
| Rubber penetration (%) | 100 | 100 | 100 | 100 | 50 | — | 100 | 10 |
| Steering stability | Good | Good | Good | Good | Good | — | Poor | Good |
| Occurrence of cracks | None | None | None | Yes | None | — | None | None |

Examples 4 to 6

Steel filaments of a filament diameter d of 0.32 were used to fabricate flattened open 1×6 structure steel cords with flatness ratios, cord long diameters $D_L$, and twist pitches P as shown in Table 2. These steel cords were used to fabricate the four types of belt structure pneumatic radial tires shown in FIG. 4 (Example 2 and Examples 4 to 6). Example 2 is the same as Example 2 in Table 1. The cord count of the belt layer of these tires, the presence of a cap ply, the cord material of the cap ply, and the elasticity of the cord material are shown in Table 2. Note that in Table 2, 66N means 66 Nylon, PET means polyethylene terephthalate, and ARAMID means an aromatic polyamide.

These tires were evaluated as to the penetration of rubber (%) in the steel cords of the belt layer, the resistance to edge separation of the belt layer, and the growth in the tire outer circumference along with driving as shown below. The results are shown in Table 2.

Rubber penetration (%)

The steel cord of the belt layer was taken out from a new tire and three of the filaments of the cord each were pulled apart to investigate the degree of penetration of rubber inside the cord. The result was shown by the ratio of the length of the portion where rubber had completely penetrated between the filaments to the length observed.

Resistance to Edge Separation

A tire was disassembled after used for actual 30 driving for 60,000 km. Cases of no occurrence of cracks in the end portion of the belt layer are indicated as "good" and cases with cracks as "poor".

Growth of Outer Circumference of Tire

JIS D-4230 was followed. Tires before and after being subjected to a durability test on an indoor drum at different speeds and loads were measured as to the outer dimensions of the belt layer. These were indicated indexed to Example 2 as 100. The smaller the figure, the smaller the growth of the outer circumference (superior).

TABLE 2

|  | Ex. 4 | Ex. 5 | Ex. 6 | Ex. 2 |
| --- | --- | --- | --- | --- |
| Filament diameter d (mm) | 0.32 | 0.32 | 0.32 | 0.32 |
| Flatness ratio | 0.70 | 0.70 | 0.70 | 0.70 |
| Cord long diameter (mm) | 1.25 | 1.25 | 1.25 | 1.25 |
| Twist pitch (mm) | 12 | 12 | 12 | 12 |
| Count (filaments/50 mm) | 30 | 30 | 30 | 30 |
| Cap ply | Yes | Yes | Yes | None |
| Cord Material | PET | ARAMID | 66N |  |
| Modulus (kgf/mm$^2$) | 800 | 3300 | 400 |  |
| Rubber penetration (%) | 100 | 100 | 100 | 100 |

TABLE 2-continued

|  | Ex. 4 | Ex. 5 | Ex. 6 | Ex. 2 |
|---|---|---|---|---|
| Resistance to separation of belt edge | Good | Good | Good | Good |
| Growth of outer circumference (index) | 30 | 5 | 45 | 100 |

From Table 2, compared to when not providing the capply (Example 2), when providing it (Examples 4 to 6), the growth of the tire at the outer circumference is smaller. The order is the case of use of an ARAMID of a modulus of 3300 kgf/mm$^2$ as the cord material of the capply (Example 5) <case of use of PET of a modulus of 800 kgf/mm$^2$ (Example 4) <case of use of 66N of a modulus of 400 kgf/mm$^2$ (Example 6).

INDUSTRIAL APPLICABILITY

As explained above, in the pneumatic radial tire of the present invention, when the steel cord material comprising the belt layer is made of a cost-effective 1×6 structure and the cord long diameter $D_L$ and twist pitch P are in the ranges specified by the above identified formulas, the twist structure is stabilized, while ensuring good penetration of the rubber into the cord and further the cord long diameter is minimized, so even if the cord count is made equal to that of a conventional belt layer, it is possible to maintain the necessary cord pitch, and therefore, it is possible to suppress the occurrence of belt edge separation. Further, since the elongation of the steel cord in the low load region is made smaller, it is possible to improve the steering stability as well.

We claim:

1. A pneumatic radial tire comprising a belt layer and a carcass layer having a tread portion, said belt layer being comprised of steel cords having a lateral flat cross-section, arranged around an outer periphery of the tread portion of the carcass layer so that the diameter direction of the steel cords follows the planar direction of the belt layer, wherein the steel cords are made of a flat 1×6 twist structure comprised of filaments of a filament diameter d of 0.20 to 0.40 mm and a long diameter $D_L$ and a twist pitch P of the steel cords when taken out from the tire are, with respect to the filament diameter d, as follows:

$3.67\ d-0.04 \leqq D_L \leqq 3.67\ d+0.16$; and
$30d \leqq P \leqq 45d$;

and wherein the elongation of the steel cords caused when increasing a load from 0.25 kg to 5.0 kg is 0.25% or less.

2. The pneumatic radial tire of claim 1, including at least one cap ply comprising an organic fiber cord having a cord angle with respect to the circumferential direction of the tire of about 0° arranged on an outer circumference of the belt layer so as to cover the entire width of said belt layer.

3. The pneumatic radial tire of claim 2, wherein the modulus of said organic fiber cord is at least 800 kgf/mm$^2$.

4. The pneumatic radial tire of claim 2, wherein said organic fiber cord is at least one fiber cord selected from the group consisting of a polyester fiber cord, an aromatic polyamide fiber cord, a rayon fiber cord, a polybenzobisoxazole fiber cord, and a polyethylene naphthalate fiber cord.

5. The pneumatic radial tire of claim 1, wherein a flatness ratio $D_S/D_L$ of the cord, where $D_S$ is the short diameter of the steel cord and $D_L$ is the long diameter thereof, is from 0.55 to 0.80.

6. The pneumatic radial tire of claim 5, including at least one cap ply comprising an organic fiber cord having a cord angle with respect to the circumferential direction of the tire of about 0° arranged on an outer circumference of the belt layer so as to cover the entire width of said belt layer.

7. The pneumatic radial tire of claim 6, wherein the modulus of said organic fiber cord is at least 800 kgf/mm$^2$.

8. The pneumatic radial tire of claim 6, wherein said organic fiber cord is at least one fiber cord selected from the group consisting of a polyester fiber cord, an aromatic polyamide fiber cord, a rayon fiber cord, a polybenzobisoxazole fiber cord, and a polyethylene naphthalate fiber cord.

9. The pneumatic radial tire of claim 1 or 5, wherein the filaments have a carbon content of from 0.82 to 0.92% and a tensile strength of from 320 to 380 kgf/mm$^2$.

10. The pneumatic radial tire of claim 9, including at least one cap ply comprising an organic fiber cord having a cord angle with respect to the circumferential direction of the tire of about 0° arranged on an outer circumference of the belt layer so as to cover the entire width of said belt layer.

11. The pneumatic radial tire of claim 10, wherein the modulus of said organic fiber cord is at least 800 kgf/mm$^2$.

12. The pneumatic radial tire of claim 10, wherein said organic fiber cord is at least one fiber cord selected from the group consisting of a polyester fiber cord, an aromatic polyamide fiber cord, a rayon fiber cord, a polybenzobisoxazole fiber cord, and a polyethylene naphthalate fiber cord.

* * * * *